(12) United States Patent
Gabler et al.

(10) Patent No.: US 6,684,949 B1
(45) Date of Patent: Feb. 3, 2004

(54) DRILLING MECHANICS LOAD CELL SENSOR

(75) Inventors: Käte Irene Stabba Gabler, Sugar Land, TX (US); Constantyn Chalitsios, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 24 days.

(21) Appl. No.: 10/064,438

(22) Filed: Jul. 12, 2002

(51) Int. Cl.⁷ ............................................. E21B 47/00
(52) U.S. Cl. ...................... 166/250.01; 166/66; 73/151
(58) Field of Search ................... 166/250.01, 65.1, 166/66, 66.7; 310/328, 330, 334, 366; 73/779, 151

(56) References Cited

U.S. PATENT DOCUMENTS

| | | |
|---|---|---|
| 3,827,294 A | 8/1974 | Anderson |
| 4,166,997 A * | 9/1979 | Kistler ........................... 338/5 |
| 4,303,994 A | 12/1981 | Tanguy |
| 4,359,898 A | 11/1982 | Tanguy et al. |
| 4,383,584 A * | 5/1983 | Dyck ........................... 177/208 |
| 4,479,564 A | 10/1984 | Tanguy |
| 4,515,011 A | 5/1985 | Beimgraben |
| 4,608,861 A | 9/1986 | Wachtler et al. |
| 4,662,458 A | 5/1987 | Ho |
| 4,775,018 A * | 10/1988 | Kroll et al. ................. 177/134 |
| 4,811,597 A | 3/1989 | Hebel |
| 4,821,563 A | 4/1989 | Maron |
| 4,848,144 A | 7/1989 | Ho |
| 4,926,686 A | 5/1990 | Fay |
| 4,958,517 A | 9/1990 | Maron |
| 4,972,703 A | 11/1990 | Ho |
| 5,386,724 A | 2/1995 | Das et al. |
| 5,431,046 A | 7/1995 | Ho |
| 5,648,617 A * | 7/1997 | Cullen et al. ........... 73/862.045 |
| 5,670,753 A * | 9/1997 | Krause ........................ 177/211 |
| 5,767,840 A * | 6/1998 | Selker ........................ 345/161 |
| 6,068,394 A | 5/2000 | Dublin, Jr. |
| 6,216,533 B1 | 4/2001 | Woloson et al. |
| 6,404,107 B1 * | 6/2002 | Lazarus et al. ............. 301/328 |
| 6,412,350 B1 * | 7/2002 | Swift .......................... 73/779 |

FOREIGN PATENT DOCUMENTS

| | | |
|---|---|---|
| EP | 0 263 644 B1 | 8/1990 |
| WO | WO 00/36273 | 6/2000 |

OTHER PUBLICATIONS

K Rappold, "Drilling Optimized with Surface Measurement of Downhole Vibrations," *Oil & Gas Journal,* OGJ Special Drilling Technology Report, Feb. 15, 1993 (pp. 58 —62).

* cited by examiner

*Primary Examiner*—Frank Tsay
(74) *Attorney, Agent, or Firm*—Jennie (JL) Salazar; Brigitte L. Jeffery; John J. Ryberg

(57) ABSTRACT

A load cell for sensing deformation in a drill collar is provided. The load cell comprises a disc member having one or more arcuate apertures and a deformation sensing element disposed on a side surface of the arcuate apertures. The load cell is capable of sensing such drilling parameters as weight and torque on a drill bit during the drilling operation.

25 Claims, 9 Drawing Sheets

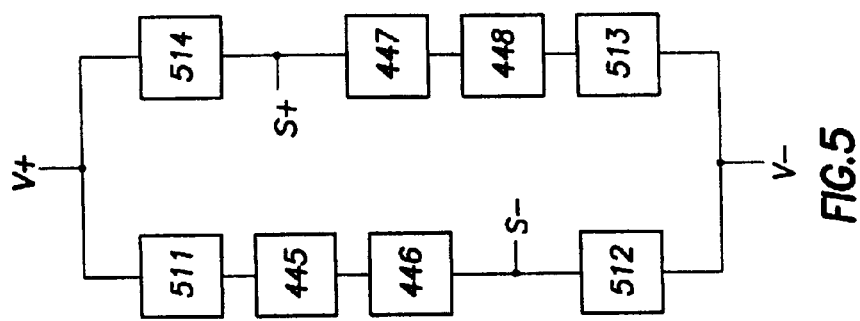
FIG. 5
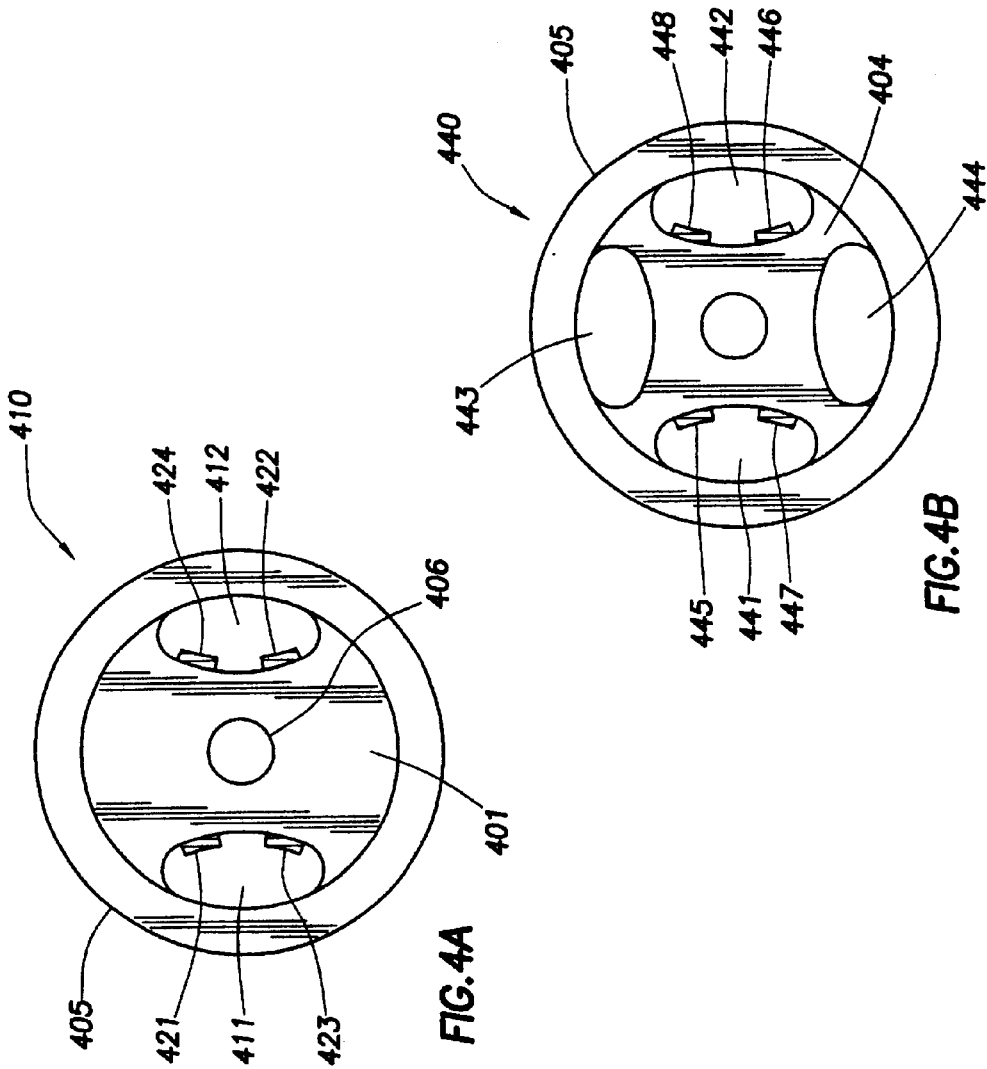
FIG. 4A
FIG. 4B

DRILLING MECHANICS LOAD CELL SENSOR

BACKGROUND OF INVENTION

FIG. 1 shows a drilling rig 101 used to drill a borehole 102 into an earth formation 103. Extending downward from the rig 101 is a drill string 104 with a drill bit 105 positioned at the bottom of the drill string 104. The drill string also has a measurement-while-drilling tool 106, and a drill collar 107 disposed above the drill bit 105.

During drilling operations, there are many forces that act on the drill bit 105 and the drill string 104. These forces include weight-on-bit ("WOB") and torque-on-bit ("TOB"). The WOB describes the downward force that the drill bit 105 imparts on the bottom of the borehole. The TOB describes the torque applied to the drill bit that causes it to rotate in the borehole. A significant issue during drilling is any bending of the drill string. Bending of the drill string can result from WOB, TOB, or other downhole forces.

The determination of the forces on the drill bit is important because it allows an operator to detect the onset of drilling problems and correct undesirable situations before a failure of any part of the system, such as the drill bit 105 or drill string 104. Some of the problems that can be detected by measuring these downhole forces include motor stall, stuck pipe, and bottom hole assembly ("BHA") tendency. By determining these forces, a drill operator is also able to optimize drilling conditions so a borehole can be drilled in the most economical way.

The typical techniques for measuring the WOB and the TOB at the surface have proven to be unreliable. Forces acting on the drill string 104 between the drill bit 105 and the surface interfere with surface measurements. As a result, techniques and equipment have been developed to measure forces on the drill string near the drill bit. One such method is described in U.S. Pat. No. 5,386,724 issued to Das et al("the Das patent"), assigned to Schlumberger Technology Corporation.

The Das patent discloses a load cell constructed from a stepped cylinder. Strain gauges are located on the load cell, and the load cell is located in a radial pocket in the drill collar. As the drill collar deforms due to downhole forces, the load cell is also deformed. The strain gauges on the load cell measure the deformation of the load cell, which is related to the deformation of the drill collar.

A strain gauge is a small resistive device that is attached to a material whose deformation is to be measured. The strain gauge is attached in such a way that it deforms along with the material to which it is attached. The electrical resistance of the strain gauge changes as it is deformed. By applying an electrical current to the strain gauge and measuring the differential voltage across it, the resistance, and thus the deformation, of the strain gauge can be measured.

As described in the DAS patent, the load cell may be inserted into the drill collar so that the load cell deforms with the drill collar. The load cell can be constructed of a material that has very little residual stress and is more suitable for strain gauge measurement. Many such materials, may include for example INCONEL X-750, INCONEL 718 or others, known to those having skill in the art.

A BHA is the drill bit and associated sensors and equipment that are located near the bottom of the borehole while drilling. FIG. 2 shows a BHA 200 positioned at the bottom of a borehole 102. The drill bit 105 is disposed at the end of the drill string 104. An MWD tool 106 is disposed proximate to the drill bit 105 on the drill string 104, with a drill collar 107 positioned proximate to the MWD tool 106. FIG. 2 shows two load cells 202, 203 positioned in load cell cavities 205 in the drill collar.

FIGS. 3A and 3B show the load cell 300 disclosed in the Das patent. The load cell 300, as shown in FIG. 3A, has eight strain gauges located on the annular surface 301. The strain gauges include four weight strain gauges 311, 312, 313, and 314, and four torque strain gauges 321, 322, 323, and 324. The weight strain gauges 311–314 are disposed along the vertical and horizontal axis, and the torque strain gauges 321–324 are disposed in between the weight strain gauges 311–314. FIG. 3B shows the load cell 300 disposed in a drill collar 331. When the drill collar 331 is deformed as a result of downhole forces, the load cell 300 disposed in the drill collar is also deformed, allowing the deformation to be measured with the strain gauges.

SUMMARY OF INVENTION

One aspect of the invention is a load cell comprising a disc member having at least two arcuate apertures and a deformation sensor disposed on a side surface of two of the arcuate apertures. In some embodiments, the disc member includes four arcuate apertures with two deformation sensors disposed in each of two diametrically opposed arcuate apertures.

Another aspect of the invention is a load cell system comprising a load cell with a strain gauge and a load cell circuitry operatively connected to the load cell, the load cell circuitry comprising a non-volatile memory adapted to store load cell calibration data.

Another aspect of the invention is a downhole sensor comprising a drill collar adapted to be disposed around a drill string and a load cell disposed in the drill collar, the load cell comprising a disc member with four radial arcuate apertures spaced at ninety degrees, at least one planar strain gauge disposed on the surface of the disc member, and at least one arcuate strain gauge disposed in each of a pair of diametrically opposed arcuate apertures, the opposed apertures aligned substantially orthogonal to a rotational axis of the drill string.

Yet another aspect of the invention is a method for measuring deformation comprising disposing a deformation sensing element in an arcuate aperture in a load cell, the arcuate aperture adapted to amplify the deformation of the load cell, placing a differential voltage across the deformation sensing element, and measuring a change in an electrical property of the deformation sensing element related the deformation of the arcuate aperture.

Another aspect of the invention includes a load cell comprising a means for amplifying a mechanical deformation of the load cell, and a deformation sensing element disposed on the means for amplifying the mechanical deformation.

Other aspects and advantages of the invention will be apparent from the following description and the appended claims.

BRIEF DESCRIPTION OF DRAWINGS

FIG. 4A shows one embodiment of a load cell according to the invention.

FIG. 4B shows another embodiment of a load cell according to the invention.

FIG. 5 is a circuit diagram according to one embodiment of the invention.

DETAILED DESCRIPTION

Figure 2:
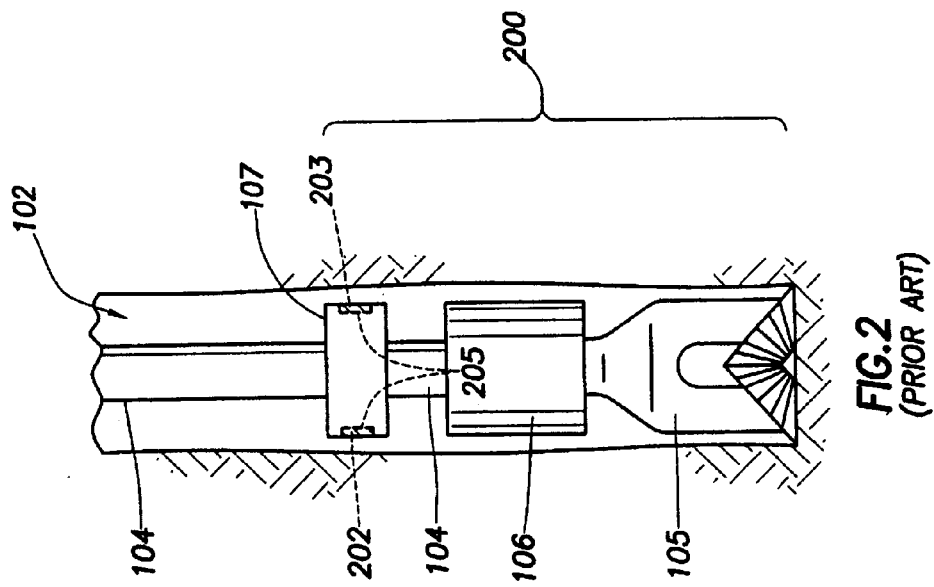
FIG. 2 is a cross-section of a prior art bottom hole assembly.
Figure 1:
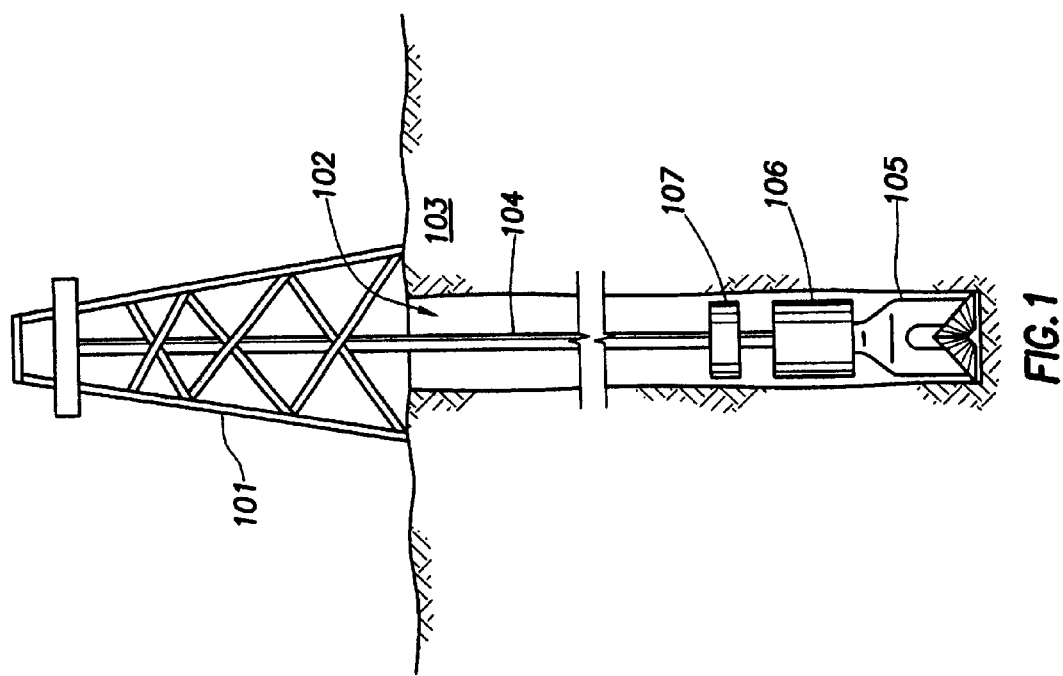
FIG. 1 is a cross-section of a drilling rig disposed over a borehole.

The present invention provides a load cell to measure the deformation of a structural member in which the load cell is disposed. The present invention also provides a method for measuring the deformation of a load cell.

One aspect of the invention is a load cell comprising a disc member with at least two arcuate apertures. FIG. 4A shows one embodiment of this aspect of the invention. The load cell 410 has a disc member 401. The disc member 401 has two diametrically opposed arcuate apertures 411, 412. Four arcuate strain gauges 421, 422, 423, 424 are located on the edge of the disc member 401, with two arcuate strain gauges in each of the opposing arcuate apertures 411, 412. A first arcuate strain gauge 421 and third arcuate strain gauge 423 are located in a first arcuate aperture 411. A second arcuate strain gauge 422 and a fourth arcuate strain gauge 424 are disposed in a second arcuate aperture 412. The arcuate strain gauges enable the load cell 410 to sense the deformation caused by forces acting on the load cell 410. A peripheral member 405 may be disposed around disc member 401. The peripheral member 405 is not required by the invention. If included, it may be constructed as a unitary piece, or as a composite of several pieces.

The load cell 410 in this embodiment also has a threaded hole 406 in the center of the disc member 401 that enables the load cell 410 to be held or gripped by a tool used to mount the load cell 410 in a structural member (not shown). The threaded hole 406 also enables the load cell 410 to be held by a tool (not shown) when being removed from a structural member. The threaded hole 406, if included may be of any shape or size that enables mounting and removal of the load cell 410.

FIG. 4B shows yet another embodiment according to this aspect of the invention. The load cell 440 has a disc member 404 with four arcuate apertures 441–444. The first arcuate aperture 441 has a diametrically arcuate aperture 442. The third 443 and fourth 444 arcuate apertures also form an opposing pair of arcuate apertures. FIG. 4B shows four arcuate strain gauges 445–448 disposed in the load cell 440. A first arcuate strain gauge 445 and third arcuate strain gauge 447 are disposed on the edge of the disc 404 in the first arcuate aperture 441. A second arcuate strain gauge 446 and a fourth arcuate strain gauge 448 are disposed in the second arcuate aperture 442, which is an opposing arcuate aperture to the first arcuate aperture 441.

Those having skill in the art will realize that many other embodiments of the load cell according to this aspect of the invention are possible. For example, the number of arcuate apertures is not limited to two and four. Any number of arcuate apertures can be used within the scope of the invention. The size and shape of the arcuate apertures is described below with reference to FIG. 6. Also, the arcuate apertures in which strain gauges are located do not necessarily required to be diametrically opposed. Further, the number of arcuate strain gauges is not limited to the embodiments shown. For example, the load cells 440 shown in FIG. 4B could be comprised of more than two arcuate strain gauges in each of the horizontally opposed arcuate apertures 441, 442. Those having skill in the art will realize that many other variations of the load cell can be devised without departing from the scope of the invention.

The arcuate strain gauges shown in FIGS. 4A and 4B and described above can be any deformation sensing element that enables the measurement of deformation. As will be described later, with reference to FIG. 6, the arcuate apertures amplify the deformation of the load cell. Thus, deformation-sensing elements in the arcuate apertures enable the measurement of the load cell deformation. In some embodiments, for example those described above, the deformation sensing elements are strain gauges. The deformation of the load cell with strain gauges can be measured by connecting the strain gauges in a suitable circuit known in the art. In this disclosure, for convenience, the deformation sensing elements will be referred to as arcuate strain gauges. The word "arcuate," as it is used to describe the strain gauges, does not describe the shape of the strain gauges, but their location in the arcuate apertures. It is expressly within the scope of the present invention that any element that is sensitive to deformation could be used. FIG. 5 shows an example of a circuit that could be used to measure the deformation of the load cell.

FIG. 5 is an example circuit diagram for a load cell with four arcuate strain gauges 445–448. Examples of such a load cell is shown in FIGS. 4A and 4B. FIG. 5 shows what is known in the art as a whetstone bridge. V+ and V− represent a reference voltage across the points shown. S+ and S− represent the voltage signal that represents the deformation of the arcuate strain gauges 445–448. The circuit shown in FIG. 5 has four reference resistors 511–514. The reference resistors can be any resistive element having a known resistance that is used to balance the arcuate strain gauge circuit. As will be described with reference to FIG. 9A, the reference resistors, in some embodiments, comprise strain gauges disposed on a plate. In this disclosure, the reference resistors will be called "plate strain gauges," although they do not necessarily comprise strain gauges, and they are not necessarily required to be disposed on a plate.

The first arcuate strain gauge 445, the second arcuate strain gauge 446, and a first plate strain gauge 511 are electrically connected between V+ and S−. Likewise, a second plate strain gauge 512 is electrically connected between S− and V−; a third plate strain gauge 513, the third arcuate strain gauge 447, and a fourth arcuate strain gauge 448 are electrically connected between V− and S+; and a fourth plate strain gauge 514 is electrically connected between S+ and V+.

Those having skill in the art will realize there are many adaptations that can be made to the strain gauge circuit shown in FIG. 5. The whetstone bridges can be adapted in various ways known in the art. FIG. 5 is only one example of a possible circuit. The particular choice of circuitry is not intended to limit the invention.

Figure 3B:
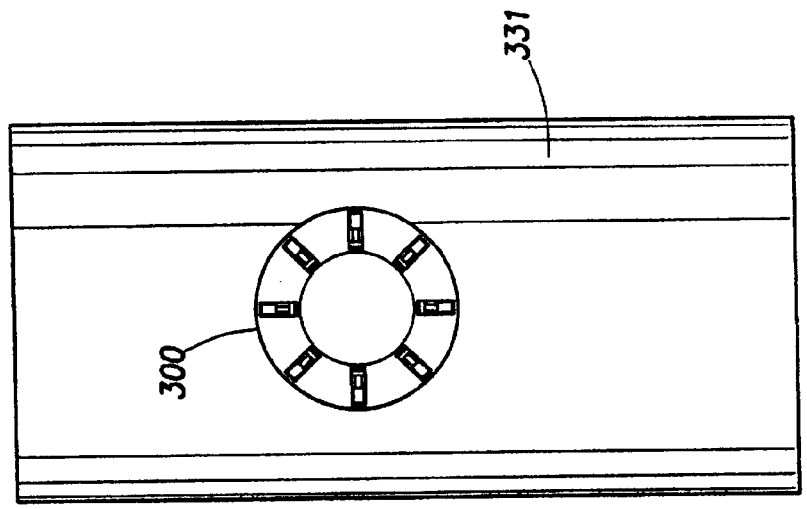
FIG. 3B shows a prior art load cell disposed in a drill collar.
Figure 3A:
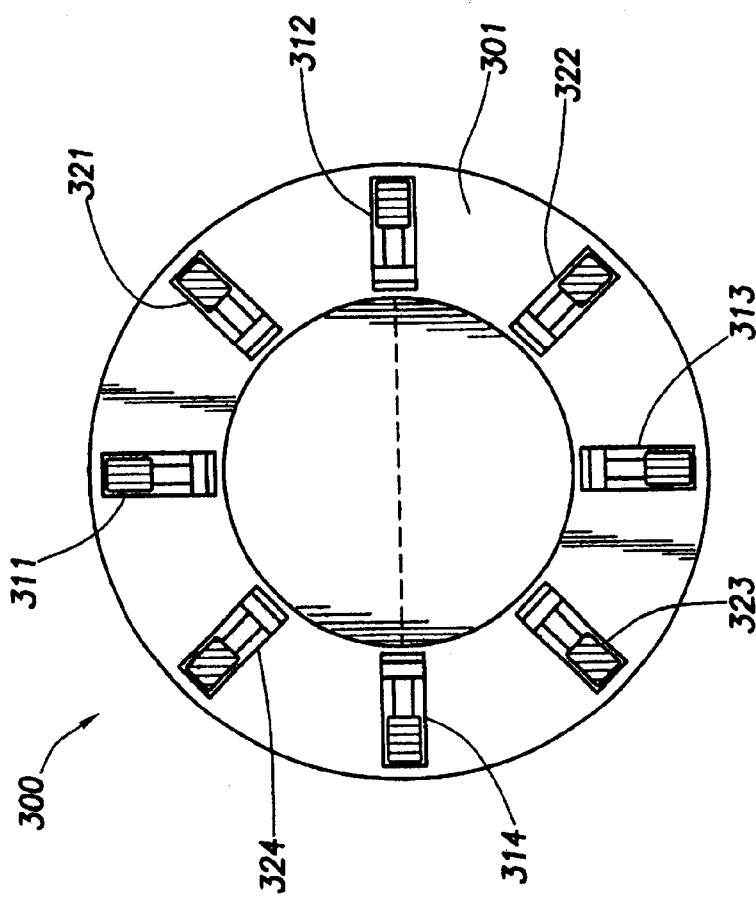
FIG. 3A shown a prior art load cell.
Figure 6:
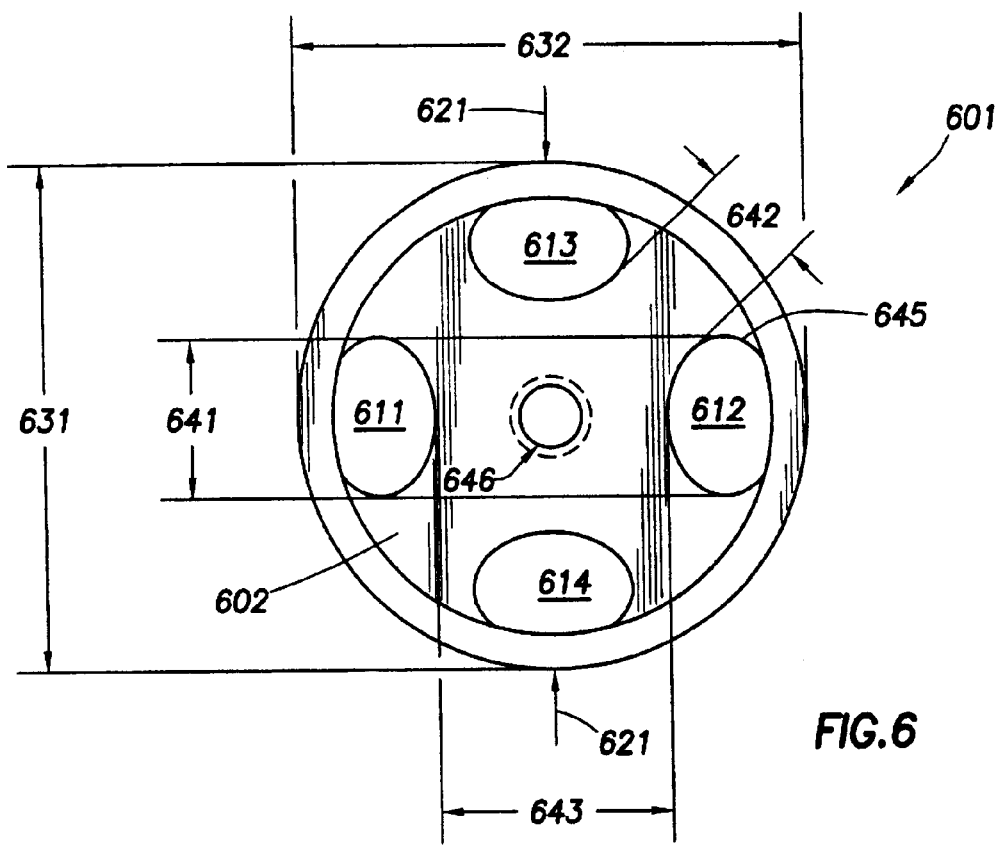
FIG. 6 shows the relationships of the dimensions of a load cell.

The load cell according to this aspect of the invention acts as a mechanical amplifier of deformation. FIG. 6 shows one embodiment of the load cell 601 with four arcuate apertures 611–614 cut out of a disc member 602. When the load cell experiences a compressive force, as indicated by arrows 621, the load cell will deform. The height 631 of the load cell in the direction of the compressive load will become shorter, while the horizontal diameter 632 will become longer. The amount of deformation is related to the magnitude of the compressive force 621. By disposing arcuate strain gauges on the side of the disc 602 in opposing horizontal arcuate apertures 611, 612, the arcuate strain gauges experience a deformation greater that they would if they were merely disposed on the surface of the load cell, as shown in prior art FIGS. 3A and 3B.

FIG. 6 shows the dimensions important to the amplification of the deformation enabled by the arcuate apertures 611–614. The arcuate apertures can be designed so as to provide the maximum amplification of the load cell deformation. First, the threaded hole 646, if present, should be as small as practicable. While still meeting the requirements of placing and removing the load cell to and from a drill collar. As the size of the threaded hole 646 increases, the strength of the load cell 601 decreases. The load cell 601 can be designed to maximize the amplification of the deformation, while still remaining in the elastic deformation range. Thus, the threaded hole 646 should be as small as practicable, thereby increasing the strength of the load cell 601. If another structure is used for the purpose of mounting and removing the load cell, it likewise should be as small as practicable.

Second, the width of the arcuate apertures 641 should be as large as practicable. As this width 641 is increased, so too is the amplification of the deformation in the aperture. Third, the distance between the apexes of opposing arcuate apertures 643 should be as small as practicable. By decreasing this distance, or equivalently increasing the height of the apertures, the deformation amplification in the apertures is increased. Fourth, the separation of adjacent arcuate apertures 642 should be as small as practicable. As this separation 642 increases, so too does the amplification of the load cell deformation.

It is noted that by increasing the amplifying the load cell deformation by adjusting the dimensions described above, it is possible that the load cell could be subject to deformation beyond the elastic range and into the plastic range. In many embodiments, the load cell 601 will not provide an accurate measurement if the load cell experiences plastic deformation. Those skilled in the art will realize that the exact dimensions depend on the material used to construct the load cell and the expected loads on the load cell.

Figure 7A:
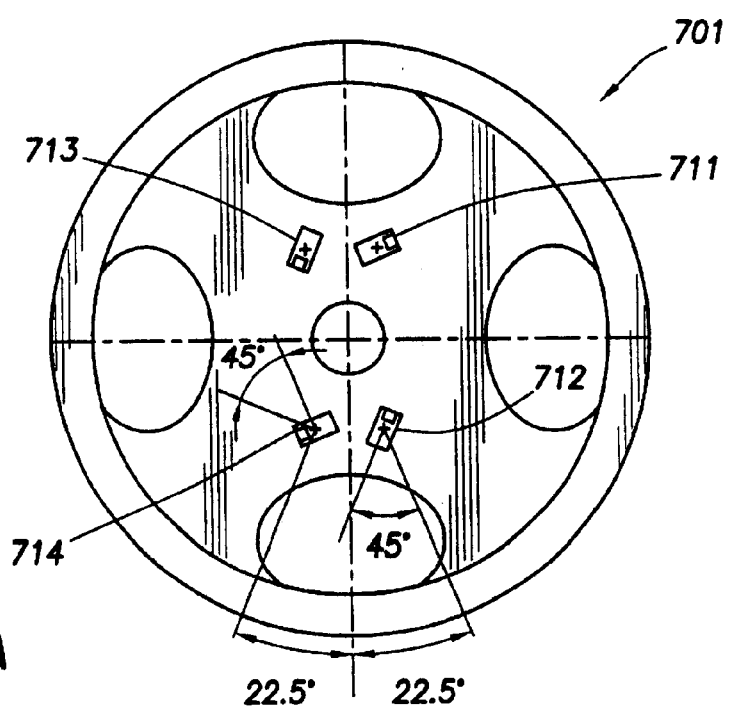
FIG. 7A shows an embodiment of a load cell with torque sensors.

FIG. 7A shows another aspect of the invention. The load cell 701 includes four planar strain gauges 711–714 disposed on the surface of disc member 702. The planar strain gauges 711–714 enable detection of a deformation caused by torque in a structural member, such as a drill collar, that contains the load cell. As is known in the art, the planar strain gauges 711–714 must be located and oriented so that they experience the sheer stress caused by torque. FIG. 7A shows one possible embodiment of planar strain gauges. Each of the planar strain gauges is located 22.5° away from an axis of the load cell 701. In FIG. 7A, the axis is shown to be vertical. A second planar strain gauge 712 is shown disposed on the bottom side of the load cell. The second planar strain gauge 712 is disposed at 22.5° to the right of the vertical axis and it is rotated 45° clockwise. Similarly, the fourth planar strain gauge is disposed 22.5° to the left of the vertical axis and rotated 45° clockwise. The first planar strain gauge 711 and the third planar strain gauge 713 are shown disposed to the above the horizontal axis of the load cell 701. Both strain gauges 711, 713 are rotated 45° counter-clockwise. It is understood that the first and fourth strain gauges 711, 713 are disposed similarly to the second and third.

It is noted, as with the arcuate strain gauges, that planar strain gauges refers to torque sensing elements, which can be any type of element that responds to deformation caused by torque. In some embodiments, the torque element are planar strain gauges. Those skilled in the art will realize that the number, position and relative angles of the planar strain gauges can vary depending on the measurement application, without departing from the scope of the invention.

Figure 7B:
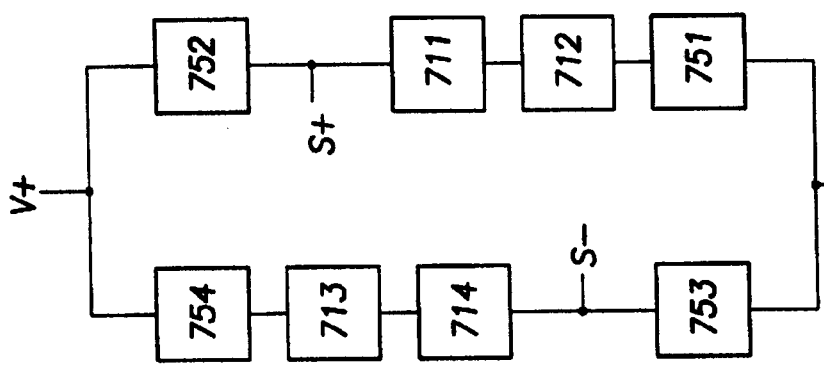
FIG. 7B shows a circuit diagram of torque sensors according to one embodiment of the invention.

An example of an electrical circuit used to measure the deformation in the torque elements is diagramed in FIG. 7B. FIG. 7B shows four torque reference resistors 751–754 used in the circuit. As with the circuit for the arcuate strain gauges, shown in FIG. 5, the torque reference resistors shown in FIG. 7B can be comprised of any resistive element having a known resistance. As will be described with reference to FIG. 9A, in some embodiments, the torque reference resistors are strain gauges. mounted on a plate disposed proximate to the load cell. For convenience, the torque reference resistors will be referred to as plate torque resistors.

The reference voltage is shown at V+ and V−, and the signal voltage is shown at S+ and S−. The third planar strain gauge 713, the fourth planar strain gauge 714, and the fourth plate torque resistor 754 is electrically connected between V+ and S−; the third plate torque resistor 753 is electrically connected between S− and V−; the first planar strain gauge 711, the second planar strain gauge 712, and the first plate torque resistor 751 are electrically connected between V− and S+; and the second plate torque resistor 752 is electrically connected between S+ and V+.

Figure 8:
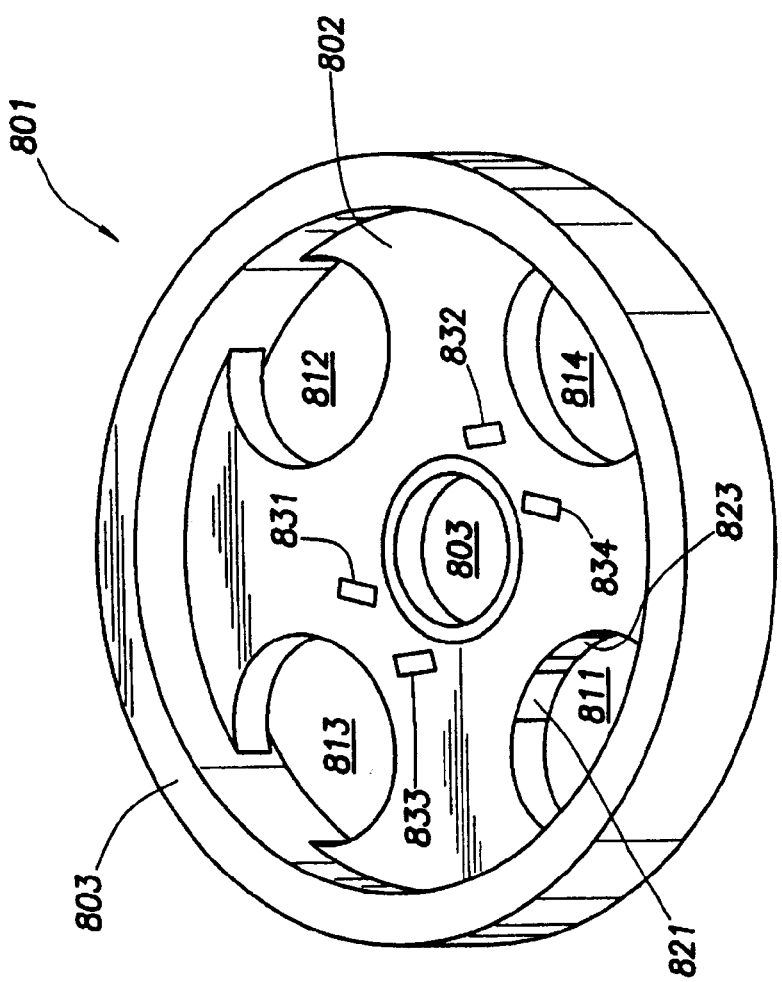
FIG. 8 is a perspective view of one embodiment of a load cell.

FIG. 8 is a perspective view of one embodiment of a load cell in accordance with the present invention. The load cell 801 is comprised of a disc member 802. Four arcuate apertures 811, 812, 813, 814 are cut out of the disc 802 and spaced orthogonally at 90° apart. A first arcuate strain gauge 821 and a third arcuate strain gauge 823 are disposed on the edge of the disc member 802 in the first arcuate aperture 811. A second arcuate strain gauge (not shown) and a fourth arcuate strain gauge (not shown) are disposed in the second arcuate aperture 812, which is located about 180° apart from the first arcuate aperture 811. The first arcuate aperture 811 and the second arcuate aperture 812 form a diametrically opposed pair of arcuate apertures. The load cell 801 shown in FIG. 8 has a peripheral member 803 disposed around the disc member 802. Again, it is noted that the peripheral member 803, if included, can be formed with the disc member 802 as a unitary piece, or it can comprise one or more separate pieces that are disposed about the disc member 802. A threaded hole 803 is located in the center of the disc member 802.

FIG. 8 also shows four planar strain gauges 831–834. The planar strain gauges are spaced as was described with reference to FIG. 7A. Torque measurements are known in the art, and this invention is not intended to be limited by the presence or placement of the planar strain gauges.

Figure 9A:
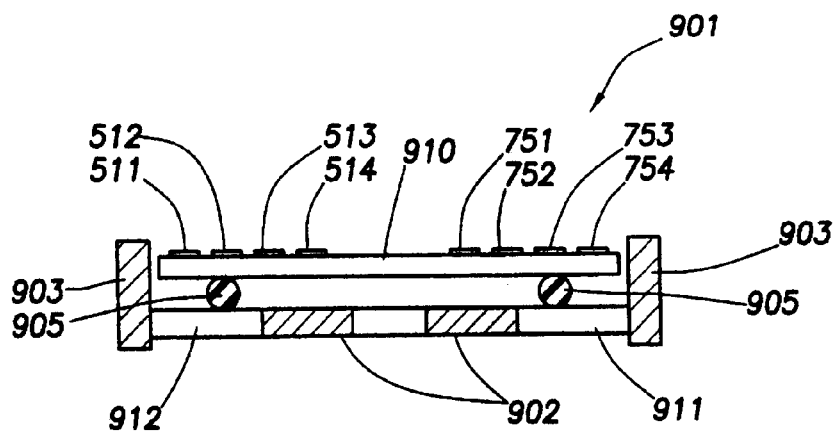
FIG. 9A is a cross-section of one embodiment of another aspect of a load cell according to the invention.

FIG. 9A shows an embodiment of another aspect of the invention. FIG. 9A is a cross-section of a load cell 901 with an independent plate 910 disposed adjacent to the disc member 902. The disc 902 has arcuate apertures 911 and 912 therein. A peripheral member 903 is disposed about the disc member 902. Plate strain gauges 511–514 (as shown in the circuit in FIG. 5) and plate torque strain gauges 751–754 (as shown in the circuit in FIG. 7B) can be disposed on the plate 910. The plate 910 is said to be independent because it is mechanically isolated from the disc member by an elastic material, such as RTV, so that the plate 910 is "floating." By mechanically isolating the plate 910, the effect of load cell deformation on the plate, the plate strain gauges, and the plate torque strain gauges may be substantially reduced.

Although the reference resistors could be any resistive element having a known resistance, in some embodiments, the reference resistors are comprised of strain gauges that are substantially the same as the arcuate strain gauges. By thermally coupling the plate 910 to the load cell 901 and constructing the plate from the same material as the disc member 902, the plate 910 will experience the same temperatures as the load cell 901 and the arcuate strain gauges on the disc member 902. By using reference resistors that are strain gauges substantially identical to the previously described arcuate strain gauges and thermally coupling the plate to the load cell, the plate strain gauges will experience the same thermal stresses as the arcuate strain gauges. Using the proper circuitry, as is shown in FIG. 5 for example, temperature strains will not affect the measurement of the load cell deformation caused by an applied force. The plate 910 can be thermally coupled to the load cell 901 through the use of thermal grease, as is known in the art. The thermal grease will not transmit any forces from the load cell 901 to the plate 910, but it will conduct heat between the load cell 901 and the plate 910. Accordingly, the reference resistors will experience the same thermal stresses as the arcuate strain gauges, and the reference resistors will experience very little of the forces exerted on the load cell.

Figure 9B:
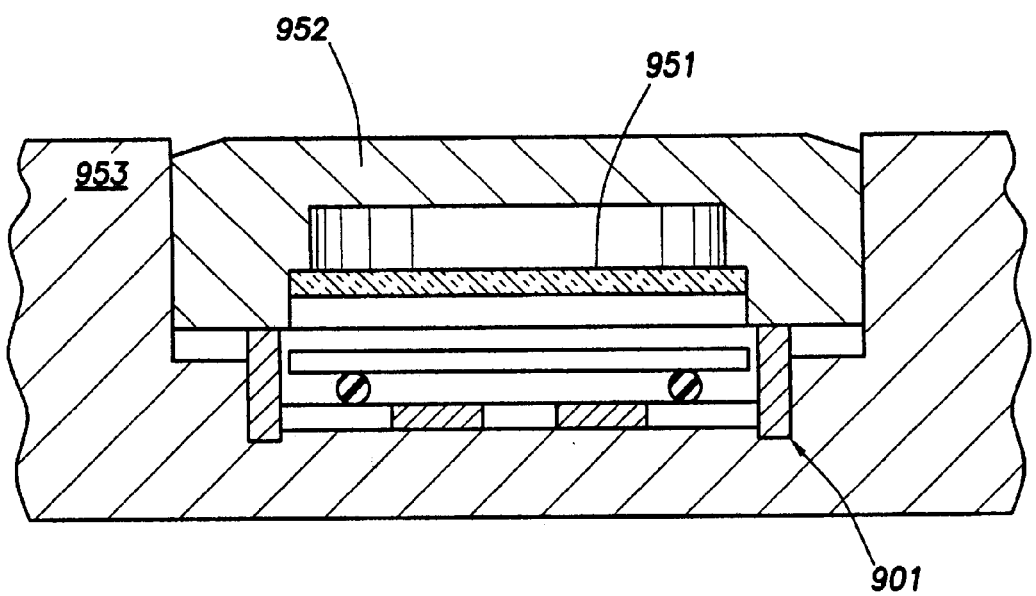
FIG. 9B is a cross-section of an embodiment of a load cell in a drill collar.

FIG. 9B shows one embodiment of another aspect of the invention. FIG. 9B shows a cross-section of the load cell 901 disposed in a drill collar 953. The load cell, shown generally at 901, is the same as is shown in FIG. 9A. A cap 952 covers the load cell 901 when it is disposed in the drill collar 953. The cap 952 protects the load cell 901 from contamination, abrasion, and corrosive chemicals that can be in the downhole environment.

FIG. 9B also shows a circuit board 951 included with the load cell 901. The circuit board comprises load cell circuitry used in the operation of the load cell 901. In some embodiments, the load cell circuitry comprises a non-volatile memory used to store calibration data for the load cell. Each strain gauge and strain gauge combination will respond differently to strains in the load cell. The calibration data allows the change in resistance for a given strain gauge or strain gauge combination to be converted into a deformation. Further, each load cell mechanically amplifies the deformation of the load cell. Thus, the calibration data can also contain data for the conversion of the strain gauge deformation into a load cell deformation.

Figure 9C:
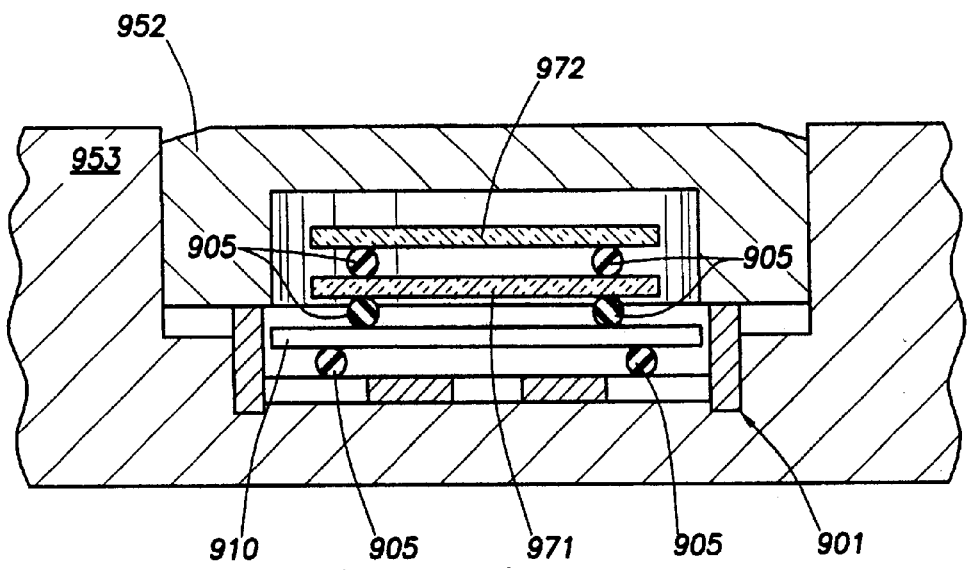
FIG. 9C shows a cross-section of another embodiment of a load cell in a drill collar.

FIG. 9C shows another embodiment according to one aspect of the invention. The load cell 901 is disposed in a drill collar 953, with a cap 952 in place to protect the load cell 901. The independent plate 910 is isolated from the load cell 901 by elastic material 905. Plate strain gauges (not shown in FIG. 9C) can be disposed on the plate 910. FIG. 9C shows two circuit boards 971, 972, each having part of the load cell circuitry (not shown). The circuit boards 971, 972 do not contact the cap, but are held in place by the elastic material 905.

Those having skill in the art will realize that several variations of this aspect of the invention can be made, without departing from the scope of the invention. For example, only one circuit board could be used, and it could be disposed near the load cell without contacting the cap. Conversely, two circuit boards could be included, both of which contact the cap. The location and number of the circuit boards is not intended to limit the invention. Further, in some embodiments, the load cell circuitry. is disposed on the independent plate with the plate strain gauges. In these embodiments, not circuit boards are required.

Figure 9D:
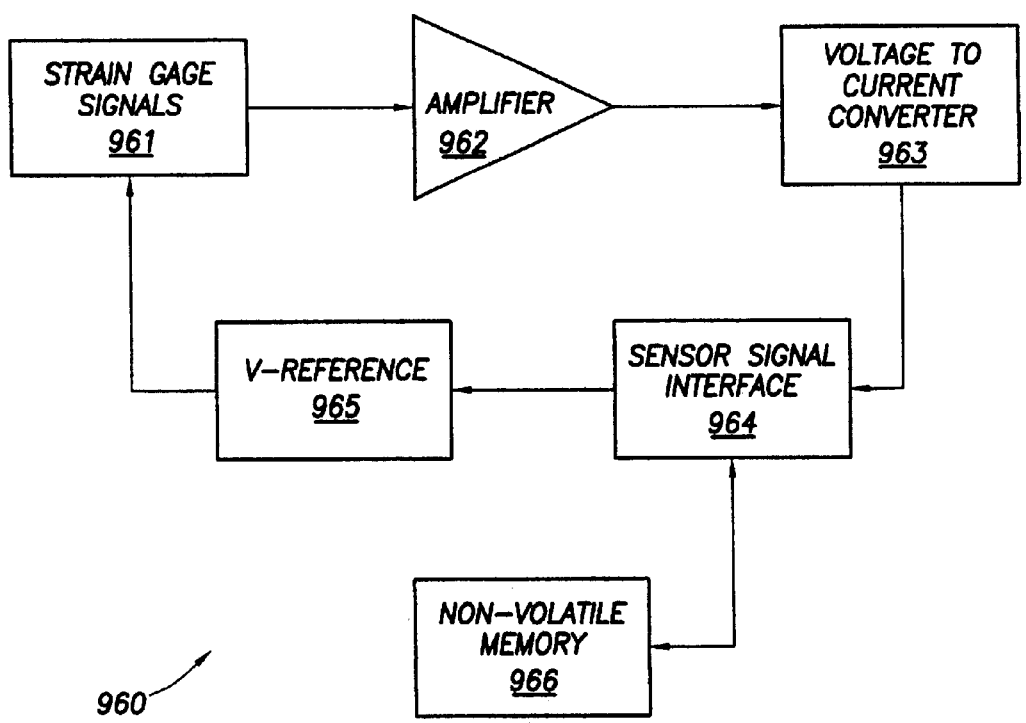
FIG. 9D is a schematic of another aspect of the invention.

FIG. 9D shows a diagram of one possible embodiment of load cell circuitry 960. Strain gauge signals are measured at 961 and pass through an amplifier 962. The amplifier 962 is located proximate to the measurement of the signals 961 so that the signals can be amplified before there is significant noise in the signal. After passing through the amplifier 962, the signals pass through a voltage to current converter 963. The converter 963 converts the voltage signal from the strain gauges to a corresponding electrical current. The electrical current is not susceptible to contact resistance and impedance in the further transmission and processing of the signal. The sensor signal interface 964 is where the load cell circuitry 960 connects to the power and sensor systems provided to the load cell. In drilling operations, this may comprise the measurement circuitry provided in the drill string.

The sensor signal interface 964 provides power to a V-reference 965 component. The V-reference component 965 provides a constant reference voltage to the strain gauge circuit for measuring the strain gauge signals 961. FIGS. 5A, 5B, and 5C show circuit diagrams containing reference voltage inputs V+/V– and signal voltage nodes S+/S–. The load cell circuitry can also comprise a non-volatile memory 966. The non-volatile memory 966 contains any calibration data that is included in the load circuitry, as described above. The non-volatile memory enables the sensor signal interface 964 to provide data that is corrected for the calibration of the load cell and the strain gauges.

Figure 10:
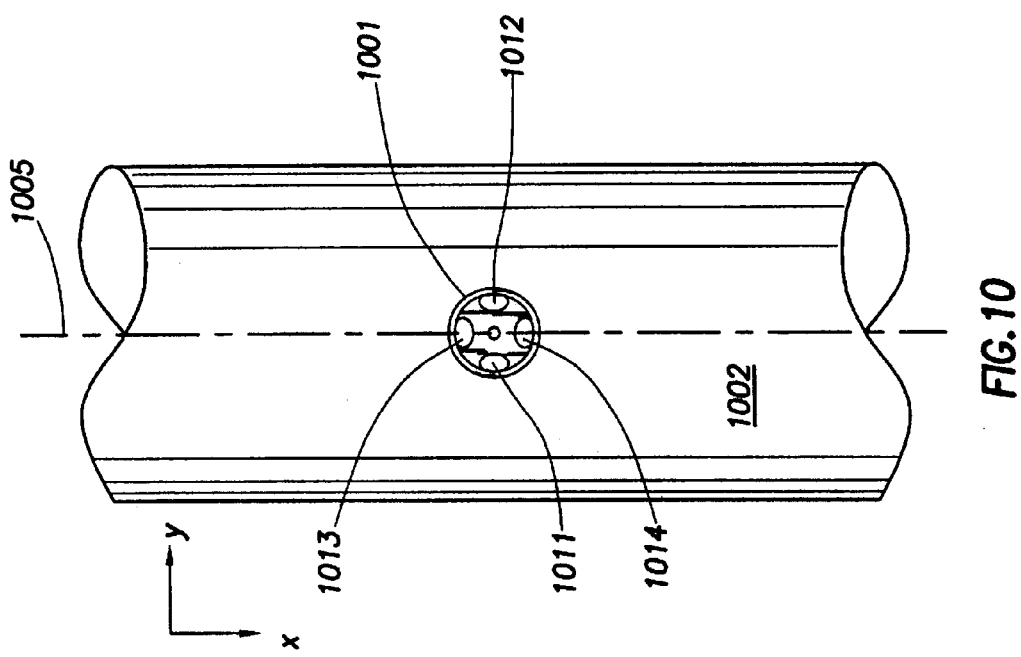
FIG. 10 shows another aspect of the invention with a load cell in a drill collar.

FIG. 10 shows one embodiment of another aspect of the invention. A load cell 1001 is disposed in a drill collar 1002 used in drilling operations. The drill collar is disposed around a drill string or drill pipe (not shown here, see FIG. 12A). The load cell 1001 has four arcuate apertures 1011, 1012, 1013, and 1014. The first arcuate aperture 1011 and the second arcuate aperture 1012 oppose each other and are disposed horizontally, such that they are substantially orthogonal to axis of rotation 1005 of the drill collar 1002.

The WOB is applied by a downward force transmitted through the drill string and the drill collar. The WOB causes the drill collar to experience a compressive load along the X-axis. In this disclosure, the X-axis runs substantially in the same direction as the axis of rotation 1005 of the drill collar 1002, but the X-axis has a positive direction that points down the drill collar 1002, as shown in FIG. 10. The load cell 1001 is in mechanical contact with the drill collar 1002 and the load cell 1001 experiences the same compressive force that the drill collar experiences. The deformation of the drill collar 1002 in the X-axis causes a corresponding deformation in the load cell. As the load cell 1001 is deformed as a result of compression in the X-axis, the first arcuate aperture 1011 and the second arcuate aperture 1012 are deflected, causing a corresponding deformation amplification in the arcuate apertures 1011, 1012, 1013, and 1014. As a result of the deformation, the resistance of any arcuate strain gauges located in the first 1011 and second 1012 arcuate apertures increases. The increase in resistance can be detected by measuring the signal voltage, as shown in FIG. 5 for example.

Figure 11:
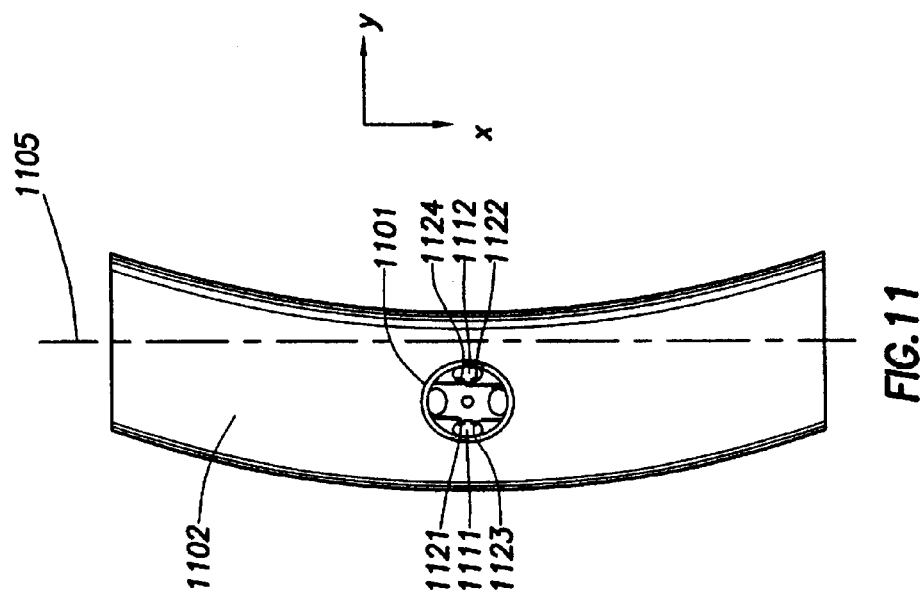
FIG. 11 shows a drill collar bending about the Z-axis.

Bending of the drill string can be caused by any number of downhole forces. FIG. 11 shows a drill collar that is bending about the Z-axis. In this disclosure, the Z-axis runs perpendicular to the X-axis and perpendicular to the plane of the disc in the load cell, as shown in FIG. 11.

It is noted that the reference coordinate axes with mutually orthogonal axes X, Y, and Z is made with reference to the drill collar. That is, the coordinate axes rotate with the drill collar. Further, use of this coordinate system is only a matter of convention and is done for ease of understanding. Any coordinate system can be used without departing from the scope of this invention.

Bending of the drill string about the Z-axis does not affect the WOB measurement made by the load cell. FIG. 11 shows the drill collar 1102 bending so that the load cell 1101 has moved to the left of the axis of rotation 1105 of the drill collar 1102. A first arcuate strain gauge 1121 and a third arcuate strain gauge are located in the first arcuate aperture 1111. The first arcuate strain gauge 1121 and the third arcuate strain gauge 1123 experience a compression due to the WOB, as described above, and a tension, or stretching, from the bending of the drill collar in the Z-axis. A second arcuate strain gauge 1122 and a fourth arcuate strain gauge 1124 are disposed in the second arcuate aperture 1012. The second arcuate strain gauge 1122 and the fourth arcuate strain gauge 1124 experience a compression from the WOB, as described above, and a further compression from the bending of the drill collar 1102 about the Z-axis.

The magnitude of the deformation of the arcuate strain gauges 1121, 1123 in the first arcuate aperture 1111 that is caused by bending about the Z-axis is equal to the magnitude of the deformation of the arcuate strain gauges 1122, 1124 in the second arcuate aperture 1112 that is caused by bending about the Z-axis, but in the opposite direction. The signal voltage, which indicated the load cell deformation, will be affected by both the offset from the strain gauges in tension and the strain gauges in compression. The offset from each one will be equal in magnitude to the offset from the other, but in the opposite direction. The resulting signal voltage will reflect the WOB, and it will not be offset due to the bending about the Z-axis.

FIG. 11 shows bending about the Z-axis where the load cell is to the left of the axis of rotation of the drill collar. It is understood that the above description applies equally to bending about the Z-axis in the other direction, where the load cell is located to the right of the axis of rotation 1105. In that case, the first arcuate strain gauge 1121 and the third arcuate strain gauge 1123 would experience compression due to bending about the Z-axis, and the second arcuate strain gauge 1122 and the fourth arcuate strain gauge 1124 would experience tension due to bending about the Z-axis. Again, the magnitudes of deformation would be equal, but in an opposite direction, and the signal voltage would reflect the WOB, unaffected by the bending about the Z-axis.

Figure 12A:
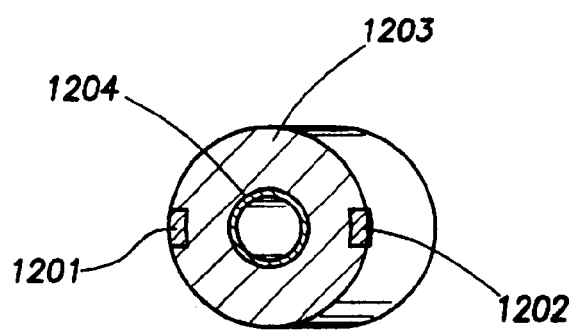
FIG. 12A is a cross-section of a drill collar according to one embodiment of another aspect of the invention.

FIG. 12A is a cross-section of a drill collar according to another embodiment of this aspect of the invention. The drill collar 1203 is disposed around a drill string or drill pipe 1204, and two load cells 1201, 1202 are disposed in the drill collar 1203, about 180° apart. In some embodiments, the second load cell 1202 has the same arrangement of arcuate strain gauges as the first load cell 1201. As will be described below with reference to FIG. 12B, the second load cell enables a correction for bending about the Y-axis. The second load cell 1202, however, need not have any planar strain gauges to measure deformation due to torque. Instead of planar strain gauges, the second load cell 1202 can include any other desirable sensor, for example a temperature sensor (not shown).

Figure 12B:
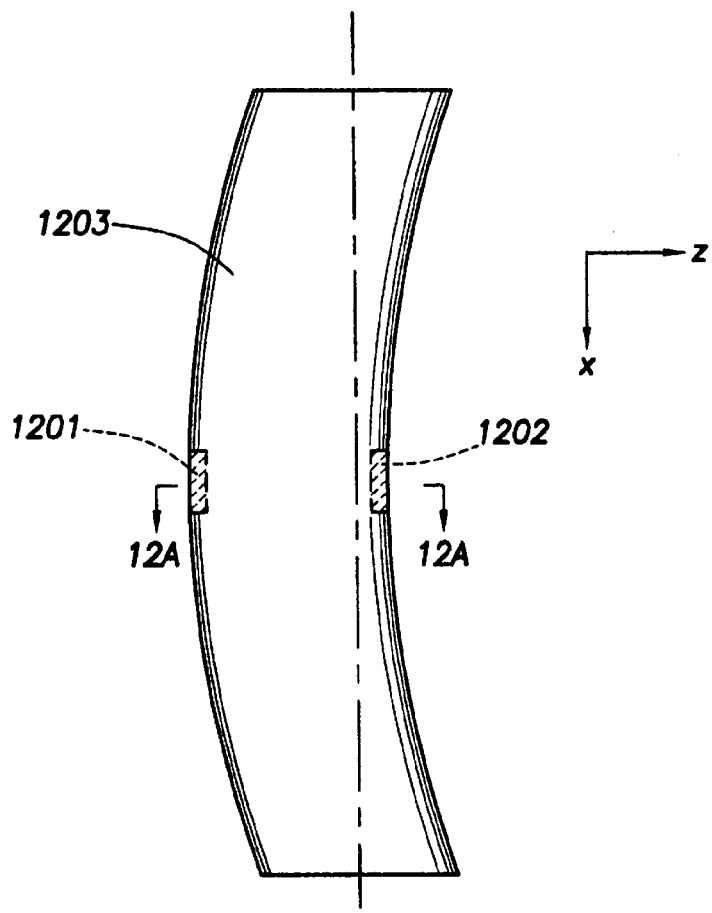
FIG. 12B shows a drill collar bending about the Y-axis.

FIG. 12B shows a drill string 1203 with bending about the Y-axis. FIG. 12B shows bending similar to that shown in FIG. 11, but the drill collar 1203 is rotated 90°. Thus, the bending shown in FIG. 12B is orthogonal to the bending shown in FIG. 11, with respect to the drill collar 1203. Instead of one side of the load cell 1201 experiencing tension from the bending and one side of the load cell being in compression, bending about the Y-axis causes the entire first load cell 1201 to experience a tensile deformation. Conversely, the entire second load cell 1202 experiences a compressive deformation due to bending about the Y-axis. This results in the first load cell 1201 measurement being lower than the WOB and the second load cell 1202 measurement being higher that the weight on bit. The offset from the true WOB in each load cell has same magnitude as the offset in the other load cell, but in the opposite direction. Thus, the average of the WOB measurement from the two load cells will yield the true WOB, with no effect from bending about the Y-axis.

The effect of bending about the Y-axis can be eliminated using only one load cell, while still gaining the advantage of the amplification of the deformation provided by the load cell. Where the bending of the drill collar is in only one direction with respect to the borehole and the drill collar is rotating, an average of the load cell measurements, taken at multiple points as the drill collar rotates, will provide an estimate of the WOB.

The load cell according to one aspect of the invention provides several possible advantages. The arcuate apertures in the load cell provide an amplification of the deformation. By placing a strain gauge in an arcuate aperture on the load cell, the resulting electrical signal caused by deformation will be much larger and, therefore, less affected by noise, contact resistance between the load cell and the signal processing circuitry, and contact impedance between the load cell and the signal processing circuitry. Further, the mechanical amplification of the deformation enables the detection of small changes in the deformation of the load cell. For example, in a drilling application, the load cell according to this aspect of the invention is sensitive to small changes in the WOB.

Another possible advantage is the elimination of bending loads from the weight measurement. For example, in drilling applications, the drill collar can experience side loads that cause the drill string to bend. Use of two properly positioned load cells eliminates the effect of bending on the WOB measurement.

The load cell according to another aspect of the invention provides other possible advantages. By including integrated electronics, for example on a circuit board included with the load cell, the calibration data for the load cell can be stored in a non-volatile memory unit included in the electronics. When a load cell in a structural member, for example a drill collar in drilling operations, is replaced, the replacement load cell has calibration data included in the integrated electronics. This eliminates the need to calibrate load cells every time they are replaced. Further, the integrated electronics can include signal processing equipment. A reference voltage supply included in the integrated electronics provides a more stable reference voltage to the sensors, thereby enabling a more accurate measurement. The proximity of the reference voltage to the sensors also reduces the noise in the circuit. An amplifier included in the integrated electronics amplifies the measurement signals near the source, thereby increasing the signal-to-noise ratio. A voltage-to-current converter included in the integrated electronics can convert the measurement voltage signals to equivalent electric currents that are not susceptible to signal path resistance.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A load cell, comprising:
   a disc member having at least two arcuate apertures; and
   a deformation sensing element disposed on a side surface of two of the arcuate apertures.

2. The load cell of claim 1, further comprising a peripheral member disposed about an outer edge of the disc member.

3. The load cell of claim 1, wherein the disc member has four arcuate apertures spaced at about ninety degrees, with two deformation sensing elements disposed in each of two diametrically opposed arcuate apertures.

4. The load cell of claim 1, wherein the deformation sensing element is a strain gauge.

5. The load cell of claim 1, further comprising four torque sensing elements disposed on a surface of the disc member.

6. A load cell system, comprising:
   a load cell with a strain gauge; and
   load cell circuitry operatively connected to the load cell, the load cell circuitry comprising a non-volatile memory adapted to store load cell calibration data.

7. The load cell system of claim 6, further comprising a circuit board wherein the load cell circuitry is disposed on the circuit board.

8. The load cell system of claim 6, wherein the load cell circuitry further comprises:
   a sensor signal interface;
   an amplifier;
   a voltage to current converter; and
   a reference voltage supply.

9. The load cell system of claim 6, further comprising an independent plate with at least one reference resistor electrically connected to the strain gauge on the load cell.

10. The load cell system of claim 9, wherein the load cell comprises four arcuate strain gauges and the independent plate comprises four plate strain gauges that are electrically equivalent to the four arcuate strain gauges.

11. The load cell system of claim 10, wherein the plate is constricted from an identical material as the load cell.

12. A downhole sensor, comprising:
   a drill collar adapted to be disposed around a drill string; and
   a load cell disposed in the drill collar, the load cell comprising a disc member with four radial arcuate apertures spaced at about ninety degrees, and at least one arcuate strain gauge disposed in each of a pair of diametrically opposed arcuate apertures, the diametrically opposed arcuate apertures aligned substantially orthogonal to a rotational axis of the drill string.

13. The downhole sensor of claim 12, wherein the load cell comprises four planar strain gauges disposed on a surface of the disc member and two arcuate gauges disposed in each arcuate aperture in the pair of diametrically opposed arcuate apertures.

14. The downhole sensor of claim 13, further comprising a circuit board operatively connected to the arcuate strain gauges and the planar strain gauges, the circuit board comprising a non-volatile memory adapted to store load cell calibration data.

15. The downhole sensor of claim 14, wherein the circuit board further comprises:
   a sensor signal interface;
   an amplifier;
   a voltage to current converter; and
   a reference voltage supply.

16. The downhole sensor of claim 12, further comprising an independent plate, the independent plate comprising:
   at least one plate resistor operatively connected to the arcuate strain gauges; and
   at least one torque plate resistor operatively connected to the planar strain gauges.

17. The downhole sensor of claim 16, wherein the independent plate is thermally coupled to the load cell.

18. The downhole sensor of claim 12, further comprising a second load cell disposed in the drill collar about one hundred eighty degrees around the drill collar from the load cell, the second load cell comprising a second disc member with four additional arcuate apertures spaced at about ninety degrees, at least one planar strain gauge on a surface of the disc member, at least one additional arcuate strain gauge located in each of a pair of opposing additional arcuate apertures, the opposing additional arcuate apertures aligned to be orthogonal to the rotational axis of the drill string.

19. The downhole sensor of claim 18, wherein the load cell comprises four arcuate strain gauges and four planar strain gauges, and the second load cell comprises four additional arcuate strain gauges.

20. The downhole sensor of claim 19, wherein the second load cell further comprises a temperature sensor.

21. A method for measuring a deformation, comprising:
   disposing a deformation sensing element in an arcuate aperture in a load cell, the arcuate aperture adapted to amplify a deformation of the load cell;
   placing a differential voltage across the deformation sensing element; and
   measuring a change in a resistance of the deformation sensing element related to the deformation of the arcuate aperture.

22. The method of claim 20, further comprising:
   disposing two deformation sensing elements in each of two horizontally opposed arcuate apertures;
   placing a differential voltage across the deformation sensing elements; and
   measuring a change in the resistance of the deformation sensing elements related to the deformation of the arcuate aperture.

23. The method of claim 21, wherein the deformation sensing elements comprise strain gauges.

24. The method of claim 22, further comprising computing the load cell deformation based on the change in the resistance of the strain gauges and load cell calibration data.

25. A load cell, comprising:
   means for amplifying a mechanical deformation of the load cell; and
   a deformation sensing element disposed on the means for amplifying the mechanical deformation.

* * * * *